Sept. 22, 1936.   C. C. FARMER   2,055,122
TRIP COCK DEVICE
Filed June 10, 1933
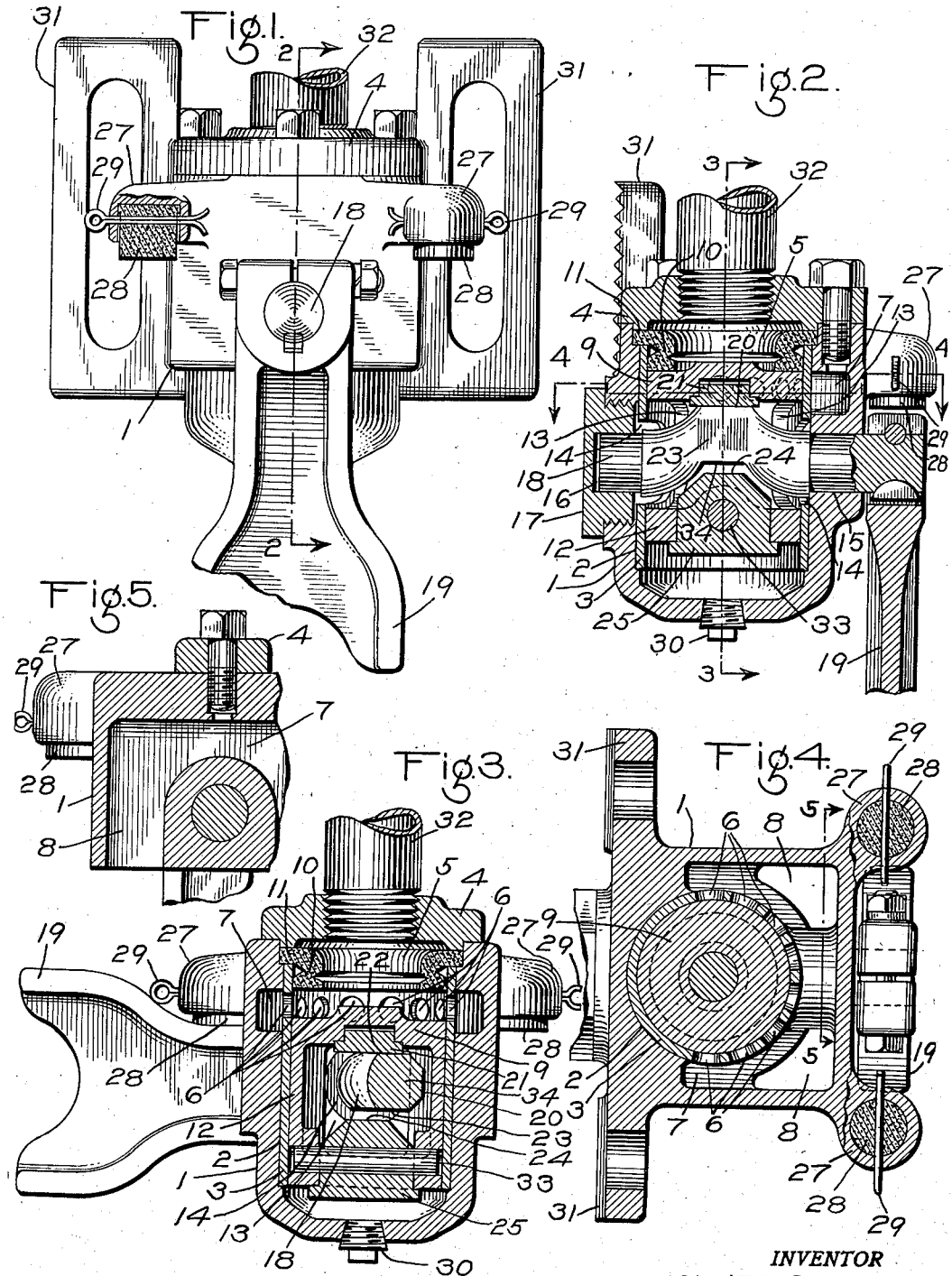
INVENTOR
CLYDE C. FARMER
BY *Wm. M. Cady*
ATTORNEY Patented Sept. 22, 1936

2,055,122

UNITED STATES PATENT OFFICE 2,055,122

TRIP COCK DEVICE

Clyde C. Farmer, Pittsburgh, Pa., assignor to The Westinghouse Air Brake Company, Wilmerding, Pa., a corporation of Pennsylvania Application June 10, 1933, Serial No. 675,212

6 Claims. (Cl. 251—39)

This invention relates to trip valve devices adapted to be operated by a trip or obstruction along the track for venting air from the brake pipe to effect an application of the brakes.

The principal object of my invention is to provide an improved trip valve device of the type in which the valve for venting fluid under pressure from the brake pipe is held closed by mechanical means and the opening of the valve is ensured by the action of mechanical means so as to obtain a device which is positive in action.

In the accompanying drawing, Fig. 1 is an elevational view of a trip valve device embodying the invention; Fig. 2 is a sectional view on the line 2—2 of Fig. 1; Fig. 3 is a sectional view on the line 3—3 of Fig. 2; Fig. 4 is a sectional view on the line 4—4 of Fig. 2; and Fig. 5 is a sectional view on the line 5—5 of Fig. 4.

As shown in the drawing, the trip valve device comprises a casing 1 having a bore 2, open at one end and lined with a cylindrical bushing 3. The open end of the bore 2 is closed by a cover 4, and the bore is connected through the cover 4 to a brake pipe 32 and through a plurality of outlet openings 6 in the bushing 3 to an exhaust chamber 7 partially surrounding the exterior surface of the bushing 3, the exhaust chamber 7 being open to the atmosphere through two downwardly directed passages 8.

A valve 9 is slidably mounted in the bushing 3, and a ring gasket 10, having a flange 11 clamped between one end of the bushing 3 and the cover 4, is adapted to be engaged by said valve for closing communication from the brake pipe chamber 5 at the upper side of said valve to the openings 6 and thence to the atmosphere.

The valve 9 is provided with a hollow, cylindrical skirt portion 12 slidably engaging the bushing 3, and diametrically opposite openings 13 are provided through said skirt portion. Similar diametrically opposite openings 14 are provided through the bushing 3 in alignment at one side with a bore 15 through the wall of casing 1 and at the opposite side with a bore 16 provided in a bearing member 17 secured to the casing 1 by screw-threaded engagement.

A rotatable member 18 extends through the openings 13 in the skirt portion 12 of the valve 9 and the aligned openings 14 in the bushing 3. One end of the member 18 is rotatably carried in bore 16 in the bearing member 17 while the other end is rotatably carried in bore 15 in the casing and extends through bore 15 to the outside of the casing. A trip arm 19 is secured to the end of the rotatable member 18 outside of the casing for turning said member.

Within the skirt portion 12 of the valve 9, the member 18 is bent to form a crank arm 34, and on the extreme outer surface of said crank arm is provided a flat surface 20 which is at right angles to a line passing through the axis of rotation of member 18 and through the center of said crank arm, so as to provide a locking means for said valve in the dead center position of said crank arm. A wear insert 21 is provided in the lower face of the valve 9 and is adapted to be engaged by the flat surface 20 of the crank arm 34 for urging the valve 9 into sealing engagement with the gasket 10. The outer end of the valve skirt 12 is provided with a bore in which is secured a wear member 25 by means of a pin 33, said wear member being adapted to be engaged by the crank 34 for pulling the valve out of engagement with gasket 10. Oppositely disposed flat surfaces 22 and 23 are provided in parallel planes on the crank 34 at right angles to the flat surface 20. The surface 22 is adapted to be engaged by the insert 21, to define the open position of the valve 9 when the trip arm 19 and therefore crank 34 is turned in one direction, while the surface 23 is adapted to be engaged by the insert 21 if the trip arm 19 is turned in the opposite direction.

A lug 27 projects from the casing at each side of the trip arm 19 in the plane of rotation thereof and each of the lugs 27 is provided with a bore in which is secured an insert 28 of rubber or the like by means of a cotter pin 29 extending through the insert and the side walls of the lug 27, so that upon rotation of the trip arm 19 in either direction, said arm will be resiliently stopped by engagement with one or the other of the inserts 28.

The bore 2 is preferably closed at the lower end to prevent entrance of dirt or other foreign matter to the operating mechanism within the bushing 3, but to permit drainage of moisture which may collect in said bore, the casing is provided with an opening at the lowest point of the bore, said opening being normally closed by a pipe plug 30. Suitable brackets 31 are formed integral with casing 1 for mounting the trip valve device where desired.

In operation, the trip arm 19 is normally carried in a vertical position as shown in Figs. 1, 2, and 4. In this vertical position the flat surface 20 on the crank 34 is in engagement with the flat surface on the wear insert 21 and thereby firmly holds the valve 9 in sealing engagement with the gasket 10, so that fluid under pressure supplied from the brake pipe 32 to chamber 5 above said valve can not escape past said valve. It will be evident that the valve 9 is automatically held in the closed position just described because rotation of the crank arm 34 from its dead center holding position can not be effected without elevating the wear member 21 and valve 9 against the gasket 10 and the pressure of fluid acting on said valve over the area within said gasket.

If the trip arm 19 is struck by a trip or other obstruction along the trackway, said arm is caused to turn the member 18 in either one direction or the other according to which side of said arm is struck, and such turning is limited by engagement with one or the other of the cushioning inserts 28, as shown in Fig. 3.

The turning of the member 18 in either direction turns the crank arm 34 out of engagement with and away from the insert 21 so that brake pipe pressure acting on the valve 9 in chamber 5 acts to move said valve downwardly until the insert 21 engages either surface 22 or surface 23 on said member, according to the direction of rotation of the trip arm. In this position of the valve 9, fluid under pressure is vented from the brake pipe 32 through chamber 5, openings 6 in bushing 3, chamber 7 and from thence to the atmosphere through passages 8.

In case the valve 9 sticks to the gasket 10 or for some other reason brake pipe pressure in chamber 5 is unable to move said valve away from said gasket when the crank arm 34 is turned out of engagement with wear member 21 in said valve, then said crank arm engages the surface 24 on the member 25, as the crank arm is rotated, and mechanically acts to shift the skirt 12 downwardly and thereby pull said valve away from the gasket 10. After said valve is pulled away from gasket 10, said valve is moved downwardly by brake pipe pressure to the open position as defined by engagement of insert 21 with either surface 22 or 23 on said member, according to the direction of rotation of said member.

When the trip valve device is operated as above described to vent the brake pipe 32, the pressure of fluid acting on the valve 9 during the venting operation, acts to hold said valve wide open, but after the brake pipe is fully vented, the weight of the arm 19 may cause the valve 9 to be moved toward the gasket 10. However, in order to ensure the full closure of the valve 9, or resetting of the device, the trip arm 19 must be manually moved to the vertical position.

It will be evident that the trip valve device is positive in action since it is moved and held in its closed position by mechanical means and the operation of said valve device to vent fluid under pressure from the brake pipe is ensured by the action of mechanical means.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In combination, a brake pipe adapted to be normally charged with fluid under pressure, and a trip valve device operative to vent fluid under pressure from said brake pipe, said trip valve device comprising a casing, a valve seat in said casing, a valve positioned in said casing and reciprocally movable into and out of engagement with the said seat, a movable member associated with said valve and movable between a valve closed and a valve open position and having a cam surface thereon and engageable with an operating surface associated with the valve when the said member is in the valve closed position for holding the valve in engagement with said seat and for opposing movement of said member away from the said valve closed position, the valve being urged into engagement with the cam surface on said movable member by the fluid under pressure in the brake pipe, said valve having another operating surface associated therewith and adapted to be engaged by a cam surface on said movable member to effect movement of the valve from the closed position to the open position by said movable member on movement of the said member from the valve closed position towards the valve open position, and a trip arm for operating said movable member.

2. In combination, a brake pipe adapted to be normally charged with fluid under pressure, and a trip valve device operative to vent fluid under pressure from said brake pipe, said trip valve device comprising a casing, a valve seat in said casing, a valve positioned in said casing and reciprocally movable into and out of engagement with said seat, a movable member associated with said valve and movable between a valve closed and a valve open position and having a cam surface thereon and engageable with an operating surface associated with the valve when the said member is in the valve closed position for holding the valve in engagement with said seat and for opposing movement of said member away from the said closed position, said movable member having another cam surface thereon adapted to be engaged by the said operating surface on the valve when said member is in the open position, the valve being urged into engagement with the cam surfaces on said movable member by the fluid under pressure in the brake pipe, said valve having another operating surface associated therewith and adapted to be engaged by a cam surface on said movable member to effect movement of the valve from the closed position to the open position by said movable member on movement of the said member from the valve closed position towards the valve open position, and a trip arm for operating said movable member.

3. In combination, a brake pipe adapted to be normally charged with fluid under pressure, and a trip valve device operative to vent fluid under pressure from said brake pipe, said trip valve device comprising a casing, a valve positioned in said casing, a valve seat in said casing and comprising a body formed of resiliently yieldable material, the valve being movable between a valve closed position in which it engages the valve seat and displaces the body thereof, and a valve open position in which it is out of engagement with the said valve seat, a movable member associated with said valve and movable between a valve closed and a valve open position and having a cam surface thereon and engageable with an operating surface associated with the valve when the said member is in the valve closed position for holding the valve in engagement with said seat and for opposing movement of said member away from said valve closed position, the valve being urged into engagement with the cam surface on said movable member by the fluid under pressure in the brake pipe, said valve having another operating surface associated therewith and adapted to be engaged by a cam surface on said movable member to effect movement of the valve from the closed position to the open position by said movable member on movement of said member from the valve closed position towards the valve open position, and a trip arm for operating said movable member.

4. In combination, a brake pipe adapted to be normally charged with fluid under pressure, and a trip valve device operative to vent fluid under pressure from said brake pipe, said trip valve device comprising a casing, a valve seat in said casing, a valve positioned in said casing and reciprocally movable into and out of engagement with the said seat, a movable member associated with said valve and movable between a valve closed and a valve open position and having a cam surface thereon and engageable with an operating surface associated with the valve when the said member is in the valve closed position for holding the valve in engagement with said seat and for opposing movement of said member away from the said valve closed position, the valve being urged into engagement with the cam surface on said movable member by the fluid under pressure in the brake pipe, said valve having another operating surface associated therewith and adapted to be engaged by a cam surface on said movable member to effect movement of the valve from the closed position to the open position by said movable member on movement of the said member from the valve closed position towards the valve open position, a trip arm for operating said movable member, and stop means cooperating with said casing and said lever for limiting the over-travel of the said lever at a distance beyond the valve open position.

5. In combination, a brake pipe adapted to be normally charged with fluid under pressure, and a trip valve device operative to vent fluid under pressure from said brake pipe, said trip valve device comprising a casing, the casing having valve seat means associated therewith, valve means movable between a closed position in which it is in engagement with said valve seat means and an open position in which it is out of engagement with the said valve seat means, one of said means having an engaging face comprising a body constructed of resiliently yieldable material, a movable member associated with said valve and movable between a valve closed position and a valve open position and having a cam surface thereon and engageable with an operating surface associated with the valve means when the said member is in the valve closed position for holding said valve means in engagement with said seat means and for opposing movement of said member away from said valve closed position, the valve means being urged into engagement with the cam surface on the said movable member by the fluid under pressure in the brake pipe, said valve means having another operating surface associated therewith and adapted to be engaged by a cam surface on said movable member to effect movement of the valve means from the valve closed position to the valve open position on movement of said movable member from the valve closed position to the valve open position, and a trip arm for operating the said movable member.

6. In combination, a brake pipe adapted to be normally charged with fluid under pressure, and a trip valve device operative to vent fluid under pressure from said brake pipe, said trip valve device comprising a casing, the casing having valve seat means associated therewith, valve means movable between a closed position in which it is in engagement with said valve seat means and an open position in which it is out of engagement with the said valve seat means, one of said means having an engaging face comprising a body constructed of resiliently yieldable material, a movable member associated with said valve and movable between a valve closed position and a valve open position and having a cam surface thereon and engageable with an operating surface associated with the valve means when the said member is in the valve closed position for holding said valve means in engagement with said seat means and for opposing movement of said member away from said valve closed position, the movable member having another cam surface thereon adapted to be engaged by the said operating surface on the valve means when said member is in the valve open position, the valve means being urged into engagement with the cam surfaces on the said movable member by the fluid under pressure in the brake pipe, said valve means having another operating surface associated therewith and adapted to be engaged by a cam surface on said movable member to effect movement of the valve means from the valve closed position to the valve open position on movement of said movable member from the valve closed position to the valve open position, and a trip arm for operating the said movable member.

CLYDE C. FARMER.